(12) United States Patent
Greub et al.

(10) Patent No.: US 7,387,446 B2
(45) Date of Patent: Jun. 17, 2008

(54) OPTICAL PLUG-IN CONNECTION

(75) Inventors: Daniel Greub, St. Gallen (CH); Besnik Zajmi, St. Gallen (CH)

(73) Assignee: Huber + Suhner AG, Herisau (CH)

( * ) Notice: Subject to any disclaimer, the term of this patent is extended or adjusted under 35 U.S.C. 154(b) by 0 days.

(21) Appl. No.: 11/804,133

(22) Filed: May 17, 2007

(65) Prior Publication Data

US 2007/0217747 A1 Sep. 20, 2007

Related U.S. Application Data

(63) Continuation of application No. 10/505,702, filed on Aug. 25, 2004, now Pat. No. 7,232,259.

(30) Foreign Application Priority Data

Feb. 25, 2002 (CH) .................................. 327/02

(51) Int. Cl.
*G02B 6/38* (2006.01)
(52) U.S. Cl. ...................................................... 385/60
(58) Field of Classification Search .................. 385/60, 385/72
See application file for complete search history.

(56) References Cited

U.S. PATENT DOCUMENTS 5,082,344 A * 1/1992 Mulholland et al. .......... 385/60
5,216,733 A 6/1993 Nagase et al.
5,946,436 A 8/1999 Takashi
6,619,856 B1 * 9/2003 Lampert et al. ............... 385/78
2002/0126961 A1 * 9/2002 Hirabayashi et al. ......... 385/78

FOREIGN PATENT DOCUMENTS

EP 413 844 A1 2/1991
WO 01/50168 A1 7/2001

* cited by examiner

*Primary Examiner*—Rodney Bovernick
*Assistant Examiner*—Chris H. Chu
(74) *Attorney, Agent, or Firm*—The Webb Law Firm

(57) ABSTRACT

An optical plug-in connection for the connection of polarization-maintaining optical fibers includes a sleeve having a bore therein and a receptacle having a bore therein for supporting the sleeve with the bore of the sleeve aligned with the bore of the receptacle. First and second ferrules are provided having bores supporting ends of optical fibers. A first end of the first ferrule is received in one end of the bore of the sleeve via one end of the bore of the receptacle. A first end of the second ferrule is received in the other end of the bore of the sleeve via the other end of the bore of the receptacle. A locking mechanism is provided for locking the first and second ferrules to the receptacle.

10 Claims, 3 Drawing Sheets

OPTICAL PLUG-IN CONNECTION

CROSS REFERENCE TO RELATED APPLICATION

This application is a continuation application of U.S. patent application Ser. No. 10/505,702, filed Aug. 25, 2004 now U.S. Pat. No. 7,232,259, entitled "Optical Plug-In Connection".

FIELD OF THE INVENTION

The present invention relates to the field of optical plug-in connector technology.

DESCRIPTION OF RELATED ART

In U.S. Pat. No. 5,946,436 there is a description of an optical plug-in connection in which two optical plug-in connectors are optically connected to each other by being plugged into a coupler from opposite sides (FIG. 8A). In each of the round plug-in connectors, the associated optical fiber ends in a ferrule, in the central bore of which the optical fiber is adhesively cemented (FIG. 1B). During connection in the coupler, the ferrules of the two plug-in connectors are guided in a hollow-cylindrical sleeve (FIG. 8B) and butt with the end face against each other in the center of the sleeve. In order to achieve optimum alignment of the cores of the two fibers to be connected, and consequently minimal coupling loss, the ferrules are aligned in a rotationally fixed manner in relation to each other in such a way as to compensate for the eccentricity of the cores. This takes place in two interlocking steps for each plug-in connector: in a first interlocking step, the ferrule holder, into which the ferrule is pressed, is interlocked with the plug housing surrounding the holder by means of slots which are arranged on the circumference of the holder and lugs which are provided on the plug housing and engage in the slots. In a second interlocking step, the plug housing is interlocked with the coupler by means of an externally attached lug when the plug-in connector is plugged into the coupler.

A comparable arrangement is proposed in WO-A1-01/50168 for the mutual alignment of polarization-maintaining optical fibers (Polarization-Maintaining Fibers PMF).

In U.S. Pat. No. 5,216,733 there is a description of a plug-in connector of the SC type for polarization-maintaining optical fibers ("PMF"), which has a plug-in connector housing with a rectangular outer contour. The ferrule of the plug-in connector is connected in a rotationally fixed manner to a flange, which has axial grooves on the outer circumference. The flange is in engagement with corresponding lugs which are attached to the inner wall of the plug-in connector housing (FIG. 16). The ferrule is in this way interlocked in a first step with the plug-in connector housing. When the plug-in connectors are then plugged into the rectangular openings of a corresponding coupler, the rectangular cross-sectional contour has the effect of fixing the plug-in connector housings in terms of their rotational angle in relation to the coupler or to each other. This corresponds to a second interlocking step on the housing level.

A disadvantage of these known methods of rotationally fixed alignment of the optical fibers in plug-in connections is that the double interlocking or alignment on the ferrule level and on the housing level means that an increased inaccuracy in the alignment of the fibers in terms of their rotational angle has to be accepted, leading to unacceptable coupling losses in the case of PM fiber connections in particular.

SUMMARY OF THE INVENTION

The present invention is an optical plug-in connection which avoids the disadvantages of known plug-in connections and, with simple construction and simplified assembly, is distinguished by increased accuracy in the alignment of the optical fibers in terms of their rotational angle in relation to each other.

In the present invention, aligning means are formed such that ferrules are aligned with respect to their angular position at a guiding device for the ferrules when plug-in connectors are plugged into a coupler.

The guiding device can include a longitudinally slotted sleeve held in a sleeve receptacle. Desirably, the guiding device causes the ferrules to be aligned with respect to their angular position at the sleeve receptacle when the plug-in connectors are plugged into the coupler. However, the ferrules can be aligned with respect to their angular position directly at the sleeve, in particular at a longitudinal slot of the sleeve.

The sleeve receptacle can be formed in one piece, whereupon misorientations in the region of the sleeve receptacle can be avoided.

The coupler can be made up of two coupler housing parts. The sleeve receptacle can be held between the coupler housing parts with play but in a substantially rotationally fixed manner.

Direct interlocking can be used when the plug-in connectors have plug-in connector housings with rectangular cross-sectional contour, and the coupler has, for the plugging in of the plug-in connectors, plug-in openings with a cross-sectional contour that is adapted to the plug-in connector housings. Although the plug-in connectors can have a fixed orientation in relation to each other because of the cross-sectional contour already on the housing level, the direct interlocking by way of the sleeve receptacle produces a much higher accuracy, which is particularly important in the case of PM fibers.

The aligning means can include an interlocking element which is connected in a rotationally fixed manner to the ferrule and comes into engagement with the sleeve receptacle—when the plug-in connectors are plugged into the coupler. The ferrules can be seated in the plug-in connectors in a rotationally fixed manner in a ferrule holder. The interlocking element can be formed as an interlocking sleeve which is seated coaxially in relation to the ferrule in a rotationally fixed manner on the ferrule holder. A lug which extends in the axial direction and engages in a corresponding axial slot in the sleeve receptacle can be arranged on the interlocking sleeve. Interlocking elements of this type can be assembled and aligned in relation to the fiber in a particularly simple manner.

BRIEF DESCRIPTION OF THE DRAWINGS

The invention is to be explained in more detail below on the basis of exemplary embodiments in conjunction with the drawing, in which.

DETAILED DESCRIPTION OF THE INVENTION

Figure 3:
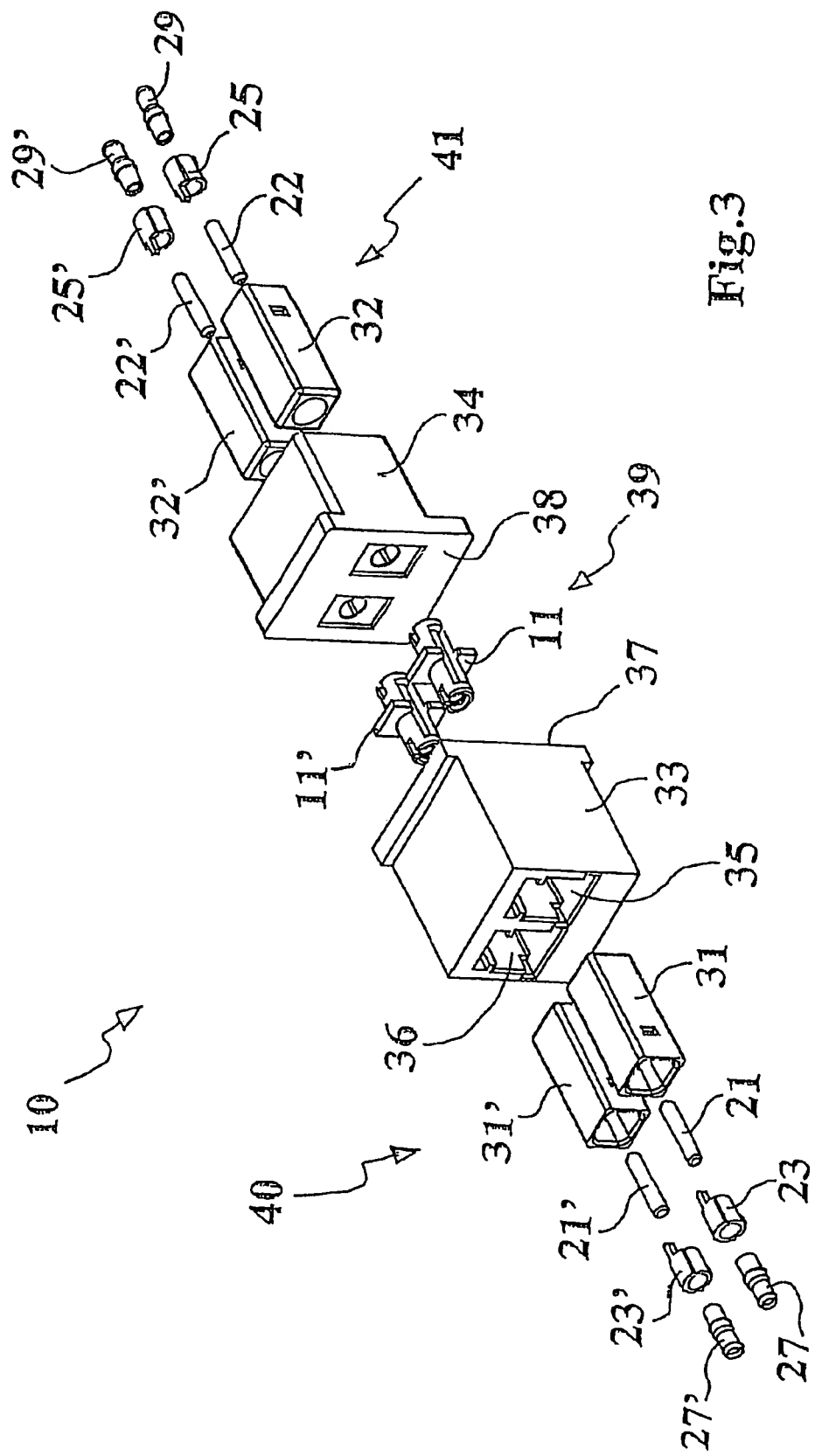
FIG. 3 shows in a perspective exploded representation a double plug-in connection constructed with the parts from FIG. 1, including the associated coupler.

In FIG. 3, an optical double plug-in connection according to a preferred exemplary embodiment of the invention is represented in a perspective exploded representation. The plug-in connection 10' substantially comprises a coupler 39, into which plug-in connectors 40 and 41 can be plugged in pairs from both sides. The coupler 39 is made up of two separate coupler housing parts 33 and 34, which are connected by their end faces 37 and 38. Arranged in each of the coupler housing parts 33, 34 are two plug-in openings 35, 36 with a rectangular cross-sectional profile, which lie in parallel next to each other and into which the plug-in connectors 40, 41 can be plugged in locking engagement. Held between the coupler housing parts 33, 34 with play but in a substantially rotationally fixed manner are two sleeve receptacles 11, 11', in each of which a longitudinally slotted sleeve (19 in FIG. 1) is mounted. The sleeve receptacles 11, 11' are represented in detail in FIG. 1. The play with which the sleeve receptacles 11, 11' are held in the coupler housing parts 33, 34 ensures that the sleeve receptacles 11, 11' move perpendicularly in relation to the axis of the connectors and can tilt out from the axis of the connectors. This "floating" mounting of the sleeve receptacles 11, 11' has the effect of achieving the decoupling between the coupler housing and the sleeve receptacles 11, 11' that is necessary to allow the ferrules to be aligned with each other largely unhindered by the guiding device comprising the sleeve receptacle 11, 11' and sleeves 19 when the plug-in connectors 40, 41 are plugged in.

In an outer plug-in connector housing 31, 31' and 32, 32', respectively, each of the plug-in connectors 40, 41 comprises, as a central component part, a ferrule 21, 21' and 22, 22', respectively, in the central bores of which the optical fibers that are to be connected by the plug-in connection 10' are adhesively cemented by their ends in a way known per se. When the plug-in connection 10' is plugged together, the ferrules 21, 21', 22, 22' are inserted into the sleeves of the associated sleeve receptacles 11, 11', where they are aligned with one another in pairs. To allow this alignment to be carried out with a fixed, predetermined angle about the axis of the plugs, the ferrules 21, 21', 22, 22' are interlocked with the sleeve receptacles 11, 11'. Used for this purpose are interlocking sleeves 23, 23' and 25, 25', respectively, which are fixedly connected to the ferrules 21, 21', 22, 22' by means of ferrule holders 27, 27' and 29, 29', respectively.

Figure 1:
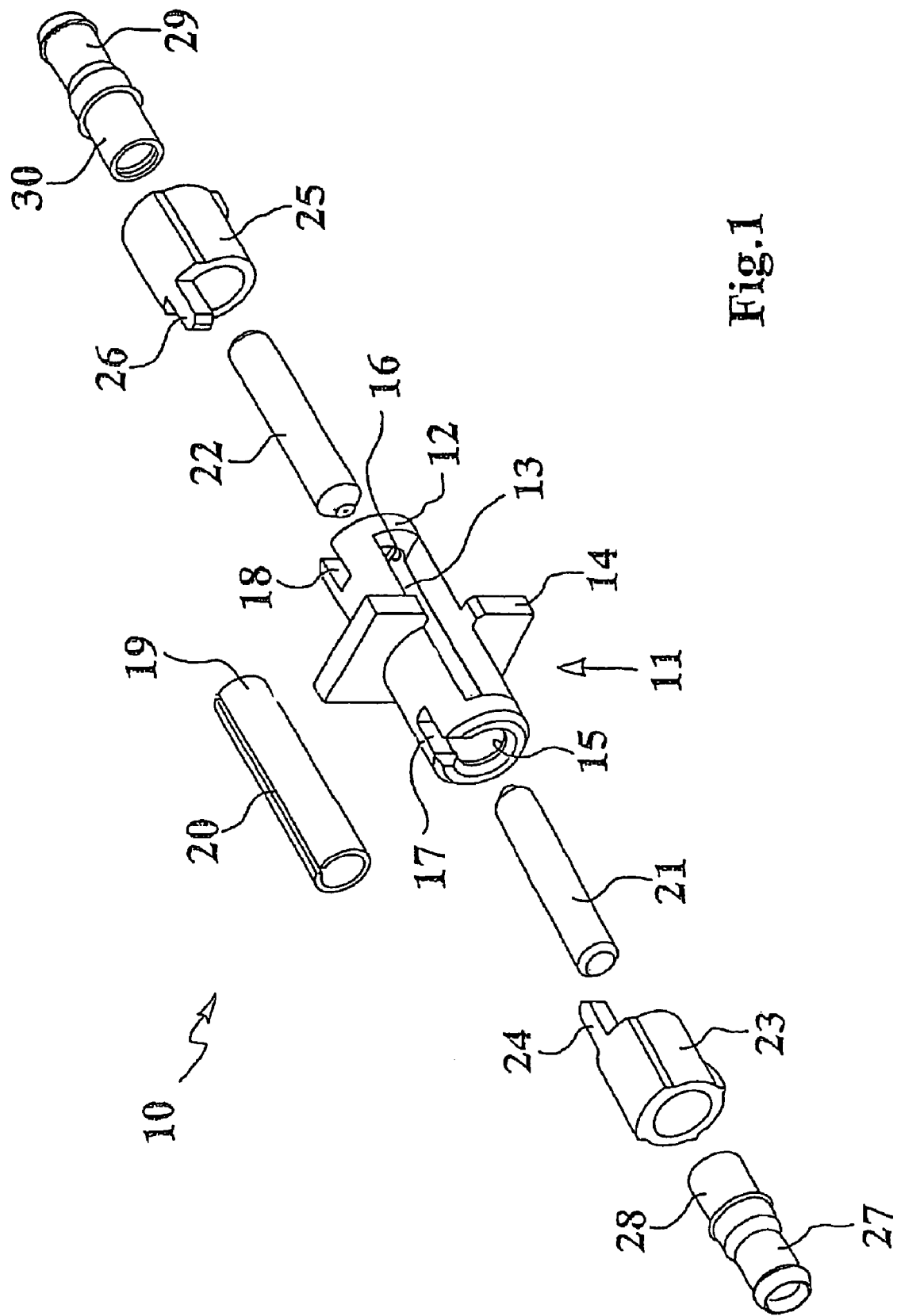
FIG. 1 shows in a perspective exploded representation the parts of a plug-in connection required for the mutual alignment of two optical plug-in connectors according to a preferred exemplary embodiment of the invention.
Figure 2:
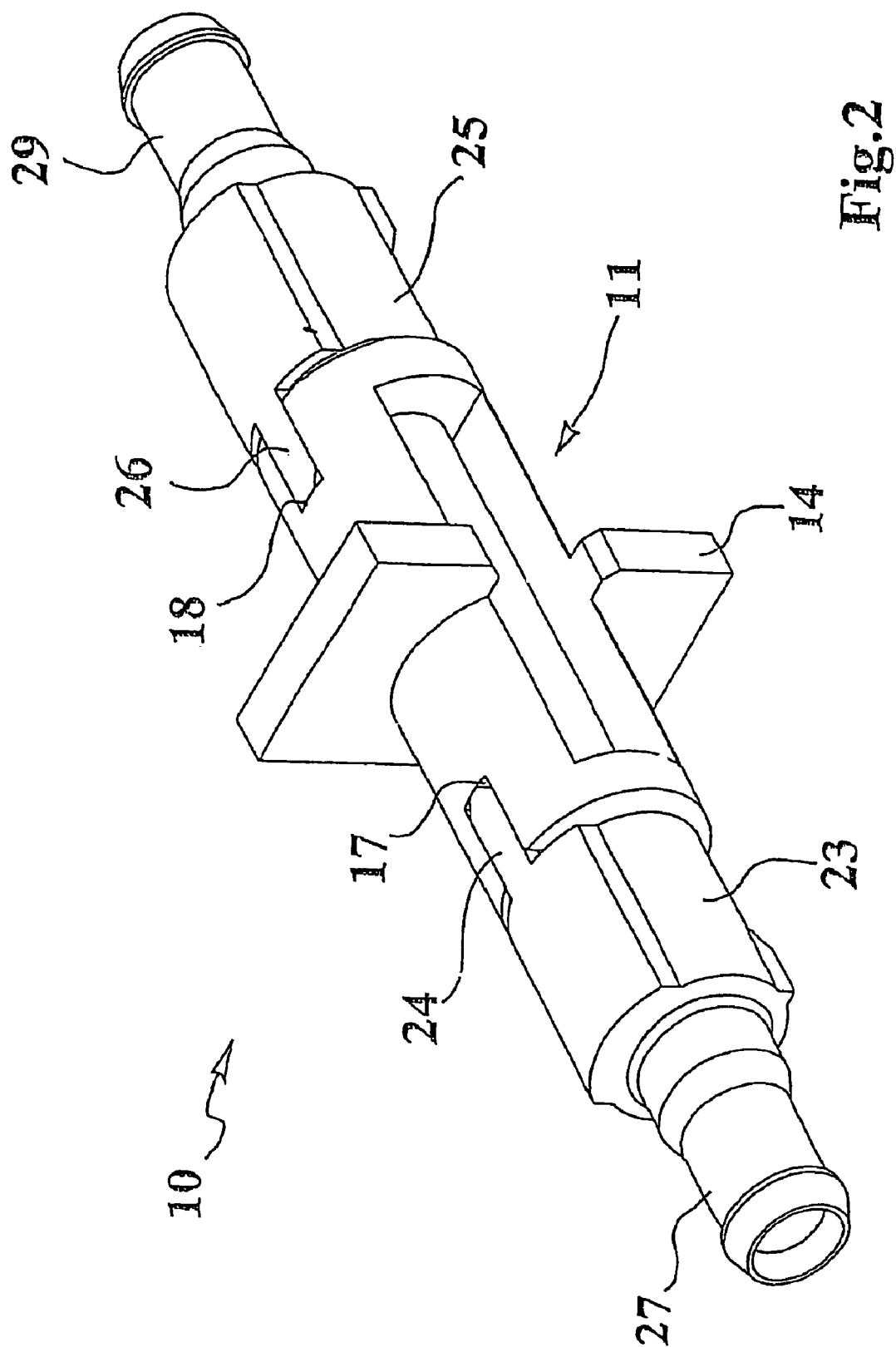
FIG. 2 shows the parts from FIG. 1 in the joined-together state.

The manner and function of the interlocking can be explained in more detail on the basis of the single plug-in connection 10 from FIGS. 1 and 2. The sleeve receptacle 11 is formed as a one-piece plastic injection molding. It substantially comprises a hollow cylinder 12 which is arranged coaxially in relation to the plugging direction and on which a flange 14 is formed in a perpendicular central plane. The interior space 13 of the hollow cylinder 12 is intended for receiving the sleeve 19. For this purpose, the sleeve 19, which has a continuous slot 20 in the longitudinal direction, is pushed into the interior space 13 from the side. Undercuts 15, 16 at both ends of the hollow cylinder, 12 prevent the sleeve 19 from falling out. The sleeve 19, which may consist of a metal, a ceramic, a plastic or some other suitable material, receives the ferrules 21 and 22, arranged in the plug-in connectors, when the plug-in connectors are plugged into the coupler (not represented), and guides them in such a way that they butt against each other with the conically tapering ends in a manner in which they are centered as much as possible.

In the central bores of the ferrules 21, 22, the ends of the optical fibers (likewise not represented) are adhesively cemented. The ferrules 21, 22 are respectively held by their ends that are facing away from the sleeve receptacle 11 in a sleeve-shaped ferrule holder 27 and 29, respectively, which is formed as a small metal tube. The ferrule holders 27, 29 have on the side facing the sleeve receptacle 11 a cylindrical receiving portion 28 and 30, respectively, onto which there can be pressed an interlocking sleeve 23 and 25, respectively. The interlocking sleeves 23, 25, which may also be made as plastic, injection moldings, respectively have on their side facing the sleeve receptacle 11 an elongated lug 24 and 26, respectively, which extends in the axial direction and with which the interlocking sleeves 23, 25 engage in corresponding slots 17 and 18, respectively, in the hollow cylinder 12 of the sleeve receptacle 11 when the plug-in connectors are plugged into the coupler (FIG. 2). The rotationally fixed seating of the interlocking sleeves 23, 25 on the ferrule holders 27, 29, in which the ferrules 21, 22 are held in a rotationally fixed manner, produces a largely direct and consequently closely toleranced alignment of the ferrules 21, 22, and of the optical fibers adhesively cemented in the ferrules 21, 22, in terms of their rotational angle with each other by means of the sleeve holder 11. As a result, accuracies in the angular alignment of the ferrules of ±0.5° can be achieved. This is particularly important if the plug-in connection is used for polarization-maintaining optical fibers (PMF).

In order for example to achieve an optimal alignment in the case of polarization-maintaining fibers, the following procedure is expediently followed: once the fiber has been adhesively cemented into the ferrule and the ferrule is seated in the ferrule holder, the interlocking sleeve is pushed onto the ferrule holder in such a way that the polarization plane forms an angle of 0° or 90° with the position of the lug on interlocking sleeve. When the lugs of the two plug-in connectors then lie opposite each other during plugging-in, the polarization-planes of the fibers also coincide.

Instead of the one lug per interlocking sleeve 23, 25, it is of course also conceivable within the scope of the invention to provide a number of lugs which are arranged such that they are distributed around the circumference and to which there are assigned a corresponding multiplicity of slots on the sleeve receptacle 11. It is also conceivable in principle to exchange the position of the slots 17, 18 and lugs 24, 26. Furthermore, other types of releasable interlocks may be provided, as long as they prevent rotation of the ferrules 21, 22 in relation to the sleeve receptacle 11.

Furthermore, it is conceivable to bring about the angular alignment of the ferrules 21, 22 with each other not by means of the sleeve receptacle 11 but directly by means of the inner sleeve 19. For this purpose, it is possible to use for example the longitudinal slot 20 of the sleeve 19, with which suitable engaging elements on the ferrules then come into engagement.

The present invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. An optical plug-in connection for the connection of polarization-maintaining optical fibers comprising:

a sleeve having a bore therein;

a receptacle having a bore therein for supporting the sleeve with the bore of the sleeve aligned with the bore of the receptacle;

first and second ferrules having bores supporting ends of optical fibers, a first end of the first ferrule received in one end of the bore of the sleeve via one end of the bore of the receptacle, a first end of the second ferrule received in the other end of the bore of the sleeve via the other end of the bore of the receptacle;

means for locking the first and second ferrules to the receptacle, wherein the means for locking includes for each ferrule;

a ferrule holder in which the second end of the ferrule is held in a rotationally fixed manner; and an interlocking sleeve coupled to the exterior of the ferrule holder in a rotationally fixed manner.

2. The optical plug-in connection of claim 1, wherein each interlocking sleeve includes a lug which is received in a slot in the receptacle.

3. The optical plug-in connection of claim 1, wherein:

the receptacle includes an opening in a side thereof for receiving the sleeve into the bore of the receptacle; and the bore of the receptacle includes undercuts adjacent the ends thereof for supporting the ends of the sleeve therein.

4. The optical plug-in connection of claim 1, wherein the bores of the sleeve and the receptacle are cylindrical.

5. The optical plug-in connection of claim 4, wherein the sleeve includes a slot that extends parallel to the bore thereof.

6. The optical plug-in connection of claim 1, further including;

a first coupler housing part having an end face and a plug-in opening that extends from the end face thereof through the first coupler housing part; and a second coupler housing part having an end face and a plug-in opening that extends from the end face thereof through the second coupler housing part, wherein the ends of the receptacle are received in the plug-in openings of the first and second coupler housing parts when the first and second coupler housing parts are connected by their end faces.

7. The optical plug-in connection of claim 6, wherein the receptacle is held by the first and second coupler housing parts in a rotationally fixed manner.

8. The optical plug-in connection of claim 6, wherein:

the optical plug-in connection further includes housings disposed between the plug-in openings and the combination of the first and second ferrules the ferrule holders and the interlocking sleeves when the first and second ferrules are received in the ends of the bore of the sleeve.

9. The optical plug-in connection of claim 8, wherein the plug-in openings and the housings have rectangular cross-sections.

10. The optical plug-in connection of claim 1, wherein the sleeve is a one-piece sleeve.

* * * * *